May 26, 1964  H. H. HOEFLER  3,134,202
ABRADING APPARATUS FOR ROTARY CLEANING OPERATIONS
Filed Jan. 11, 1962  6 Sheets-Sheet 1

INVENTOR.
HARRY H. HOEFLER
BY Watts & Fisher
Attorneys

May 26, 1964          H. H. HOEFLER          3,134,202

ABRADING APPARATUS FOR ROTARY CLEANING OPERATIONS

Filed Jan. 11, 1962          6 Sheets-Sheet 2

INVENTOR.
HARRY H. HOEFLER
BY Watts & Fisher
Attorneys

INVENTOR.
HARRY H. HOEFLER
BY Watts & Fisher
Attorneys

May 26, 1964 H. H. HOEFLER 3,134,202
ABRADING APPARATUS FOR ROTARY CLEANING OPERATIONS
Filed Jan. 11, 1962 6 Sheets-Sheet 4

INVENTOR.
HARRY H. HOEFLER
BY Watts & Fisher
Attorneys

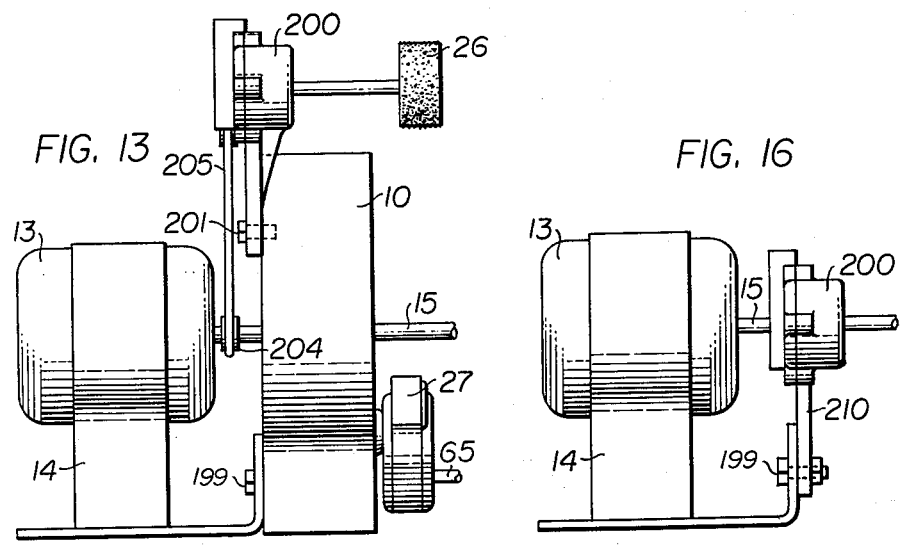
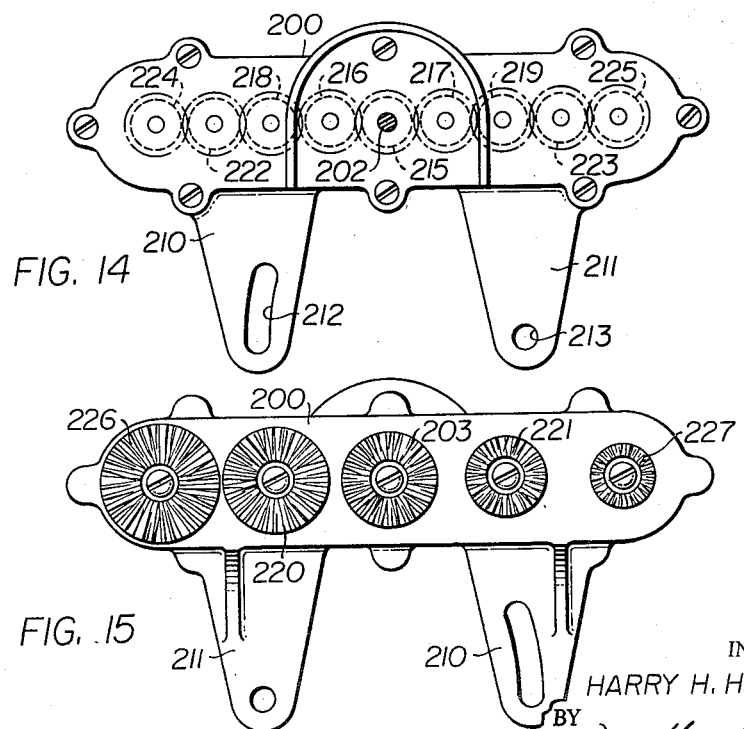

United States Patent Office 3,134,202
Patented May 26, 1964

3,134,202
ABRADING APPARATUS FOR ROTARY CLEANING OPERATIONS
Harry H. Hoefler, Magnolia Drive, Mentor, Ohio
Filed Jan. 11, 1962, Ser. No. 165,573
29 Claims. (Cl. 51—90)

This invention relates generally to abrading apparatus for rotary cleaning operations, and more specifically to work preparation which is especially suited for cleaning tubes and couplings prior to soldering or otherwise bonding of the tubes and couplings.

This application is a continuation-in-part of my copending application Serial No. 81,478, filed January 9, 1961, and entitled "Work Preparation Device," now abandoned.

In modern buildings, plumbing installations are now almost exclusively made up of copper components. In copper plumbing systems, copper tubes are joined together by fittings or couplings which are soldered to the tubes. During installation, each tube is then inserted into the fitting or coupling and the two are soldered together.

For proper and dependable soldering or other bonding, the mating surfaces of the tubes and couplings must be clean. In the past, a number of proposals have been made for cleaning tubes and couplings but none of them fully satisfactory. This invention is directed to an improved apparatus which is designed to clean both the inside and outside surfaces of tubes and couplings in the regions to be soldered. The mechanism is simple, dependable, easy to operate, and is constructed to clean tubes and couplings of a wide variety of sizes by automatically adjusting itself to accommodate the selected size.

In general, the work preparation apparatus of the invention includes a motor mounted on a frame and a work tool support for mounting the work preparation tool. The work tool support has a rotating section positioned to rotate about the axis of the motor drive shaft. The drive shaft is connected to the rotating section to cause it to rotate.

The work preparation tool is rotatably carried by another section of the tool support which is pivotally mounted on the rotating section. The tool holding section is mounted on the first section of the tool support to pivotally shift the work tool toward and away from a workpiece. A power transmission is included in the apparatus for connecting the motor drive shaft to both sections of the work tool support and to the rotary work preparation tool. A slip clutch arrangement is disposed between the power transmission and the second section of the tool support so that the work tool can operatively be urged into work-performing abutment with the workpiece.

In operation, the rotating brush is biased into work-performing relationship with the workpiece and is simultaneously orbited about the axis of the work by the rotating section of the work tool support. In this manner the surface portion of the tube to be soldered is very quickly and thoroughly prepared for the soldering operation.

A principal object of the invention is to provide a novel and improved work preparation apparatus for preparing a workpiece for soldering or similar operations.

A more specific object of the invention is to provide work preparation apparatus for rotary cleaning operations which includes a rotatable work preparation tool carried by a simultaneously rotating tool support and structure for biasing the tool against the surface of the workpiece.

A further object of the invention is to provide a novel and improved work preparation apparatus which includes a work tool support composed of two relatively movable sections, one of which operatively supports a rotating work tool for selected movement toward or away from the axis of the workpiece, whereby the apparatus is capable of accommodating workpieces of a wide variety of diameters.

An additional object of the invention is to provide a work preparation apparatus as generally described above wherein the work preparation tool can be operatively biased against either the peripheral outside surface of the workpiece or against the inside surface of the workpiece to perform an improved cleaning operation.

A related object of the invention is to provide a novel and improved work preparation apparatus as generally described above including a slip clutch interposed between the work tool support sections for operatively biasing the work tool against the surface of the workpiece.

Yet another object of the invention is to provide a versatile work preparation apparatus which includes a plurality of simultaneously rotatable work preparation tools for cleaning the inside surfaces of couplings of different diameters.

A more specialized object of the invention is to provide a novel and improved burnishing tool for preparing copper tubes and couplings or the like for soldering or similar operations, which tool includes an annular resilient body and a plurality of flexible abrasive members fixed to the body in circumferentially spaced locations in which the members are slit to provide a plurality of elongated abrading and flexible fingers.

Another object of the invention is to provide a work preparation apparatus as described above including a power transmission train between the motor shaft of the apparatus and the work tool support, the power transmission train being disengageable so that the work tool support can remain motionless during operation of the motor.

Other objects and advantages of the invention will become apparent from the following detailed description and the accompanying drawings.

In the drawings:
FIGURE 1 is a side elevational view of the apparatus taken on the line 1—1 of FIG. 2, with portions of the frame housing being partially broken away;
FIGURE 2 is a front elevational view of the apparatus showing the work tool support and the work preparation tool in an inoperative position;
FIGURE 3 is a view similar to FIG. 2 showing the apparatus in its operative position for external cleaning;
FIGURE 4 is a sectional view taken along the line 4—4 of FIG. 1 with portions of the frame housing being broken away to expose the operative mechanism;
FIGURE 5 is a sectional view taken along the line 5—5 of FIG. 1;
FIGURE 6 is a sectional view taken along the line 6—6 of FIG. 5;
FIGURE 7 is a sectional view taken along the line 7—7 of FIG. 4;
FIGURE 8 is a front elevational view of the apparatus similar to FIG. 3, but showing the apparatus in operative position for cleaning the insides of relatively large couplings;
FIGURE 8A is a sectional view similar to FIG. 7, but showing the apparatus in operative position for cleaning the inside walls of relatively small tubes;
FIGURE 9 is a fragmentary cross-sectional view of another embodiment of the invention;
FIGURE 10 is a fragmentary view taken on the line 10—10 of FIG. 9;
FIGURE 11 is a side elevational view, with portions of the frame housing being partially broken away, of still another modified embodiment of the invention;
FIGURE 11A is a fragmentary, cross-sectional view of the embodiment of FIG. 11 and shows the power train of the apparatus disengaged;

FIGURE 13 is a side elevational view of still another embodiment of the invention;

FIGURE 14 is a rear elevational view of a portion of the apparatus illustrated in FIG. 13;

FIGURE 15 is a front elevational view of the structure illustrated in FIG. 14;

FIGURE 16 is a side elevational view of still another embodiment of the invention.

Figure 1:
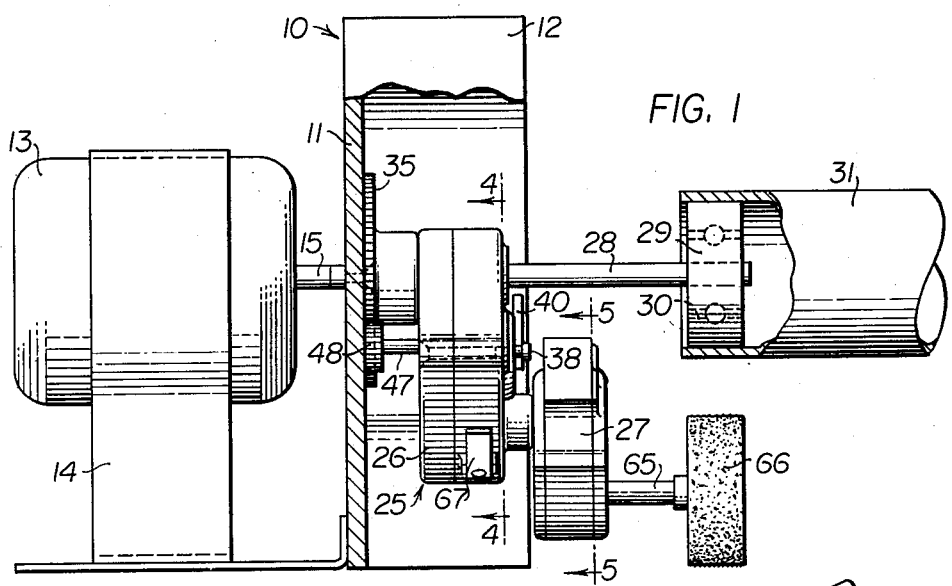
Figure 2:
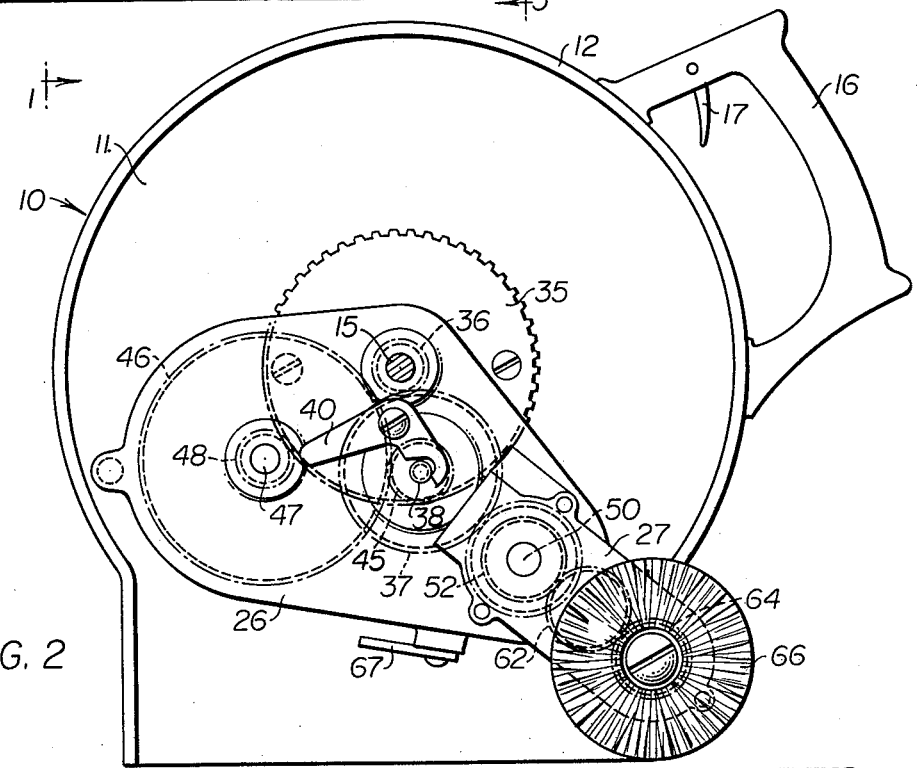

Referring now to the drawings, and to FIGS. 1 and 2 in particular, a frame is shown generally at 10. The frame 10 is in the form of a housing including a back plate 11 and an arcuate housing plate 12. The frame housing 10 is open at its end opposite the back plate 11.

A motor 13 is connected to the frame 10 by a motor bracket 14 which is secured to the outside surface of the back plate 11. The motor 13 has a drive shaft 15 that is journaled through the back plate of the frame 10. In the illustrated embodiment of the invention, a handle 16 is integrally secured to the outside of the arcuate housing plate 12. The handle 16 includes a trigger switch 17 for actuating the motor 13. In an alternative construction the apparatus may be actuated by a conventional electric drill held by the motor bracket 14.

A work tool support generally indicated by reference numeral 25 is freely mounted on the motor drive shaft 15. As will hereinafter be described in more detail, the work tool support 25 includes an orbital housing 26 and a tool support housing 27. The motor shaft 15 is removably connected to an auxiliary shaft 28 which carries a removable mandrel 29. The mandrel 29 may be bearinged to provide a non-rotative outer race portion 30 for positioning and supporting a workpiece 31.

The shaft extension 28 is preferably three-eighths inches in diameter to receive a workpiece of that inside diameter. Thus, with minimum size workpieces, the shaft 28 may serve as the mandrel. For this reason, the shaft 28 is preferably a pin separate from the drive shaft. It is also desirable to form the shaft extension 28 as a separate and removable pin to facilitate the connection of the motor shaft 15 to apparatus for cleaning a plurality of small couplings and tubes as will be more specifically described.

A fixed pinion gear 35 surrounds the motor shaft 15 and is fixed to the inside surface of the back plate 11. The following description will explain in detail the operation of this fixed gear 35 in its action in producing orbital movement of the housing section 26 of the work tool support 25.

The work tool support 25 includes a power train to cause orbital rotation of the tool support about the axis of the motor shaft 15 and simultaneous rotation of the work preparation tool. According to the preferred embodiment of this invention, this power train is formed by a gear transmission. Modification of the power train, however, will be obvious to one skilled in the art.

Figures 4, 5:
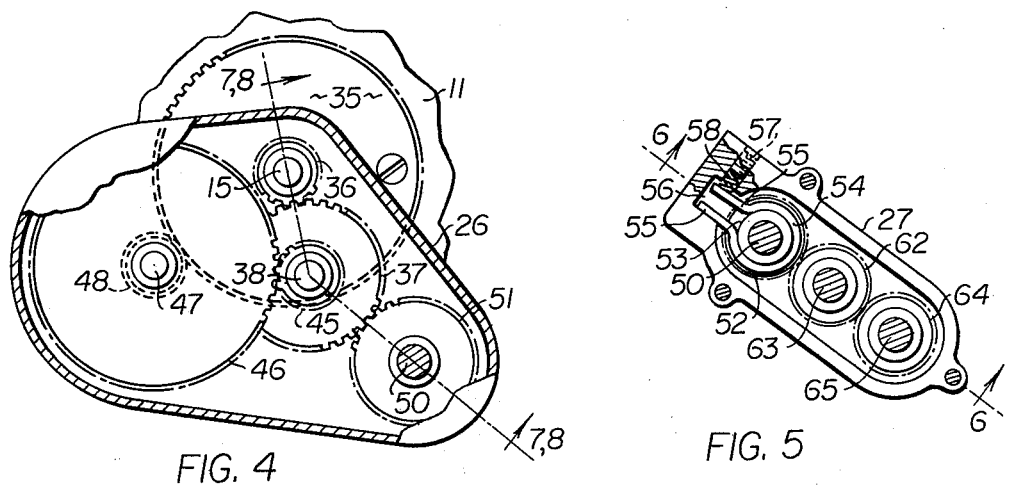
Figure 6:
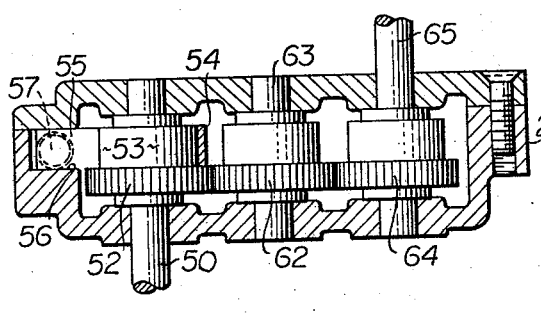
Figure 7:
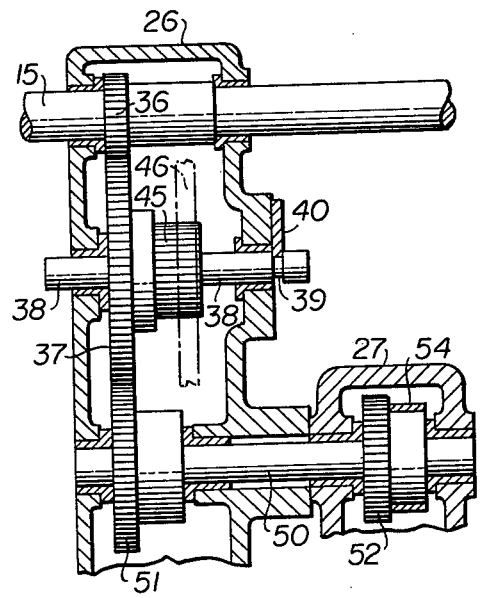

The gear transmission forming the power train includes a gear train section which is contained within the orbital housing 26. Referring to FIGS. 4 and 7 in particular, this orbital gear portion of the power train is shown to include a drive gear 36 which is fixed to the motor shaft 15. This drive gear 36 drives a large idler gear 37 which is secured to and carried by an idler shaft 38.

In the preferred form, the idler shaft 38 is mounted in the walls of the housing 26 for axial reciprocation so that the idler gear 37 can be disengaged from the drive gear 36. To this end, the idler shaft extends through the front wall of the housing 26 and is formed with a neck 39. A key 40 is pivoted to the front wall of the housing 26 for cooperating with the neck 39 to lock the idler shaft in the operative position illustrated in FIG. 7 wherein the gears 36 and 37 are engaged. By pivoting the key 40 out of engagement within the neck 39, the idler shaft 38 can be pulled forwardly in the housing 26 to disengage the idler gear from the drive gear.

The idler shaft 38 also carries a second gear 45 which is secured thereto. The gear 45 is smaller than the idler gear 37 and drives a large rotation-producing gear 46. The rotation-producing gear 46 is secured to a rotation shaft 47 which is also journaled in the housing 26. As shown most clearly in FIG. 1, this rotation shaft 47 extends through the rear wall of the housing 26 and carries at its end a small rotation-producing pinion gear 48. The small rotation-producing pinion gear 48 meshes with the fixed gear 35 on the back plate 11 of the frame.

The orbital gear portion of a power train thus far described causes rotation of the work tool support 25 about the axis of the motor shaft 15 and relative to that shaft. This action is provided by the shaft 15 driving the small drive gear 36 which drives the large idler gear 37 on the shaft 38. The gear 45 which is also mounted on the shaft 38 drives the large rotation-producing gear 46 to cause the small pinion gear 48 to rotate. When the small pinion gear 48 rotates, it will, since it is meshed with the fixed gear 35, tend to "walk around" or orbit the fixed gear. When the small pinion gear 48 orbits around the fixed gear 35, it carries the remainder of the work tool support 25 with it and causes the entire support to rotate.

Reference is now made to FIGS. 2, 5, 6 and 7 which illustrate most clearly the second gear portion of the power train which is contained within the tool housing 27. As shown in FIG. 7, the tool support housing 27 is freely carried on a tool support shaft 50. The tool support shaft, like the shafts 38 and 47, is journaled in the walls of the orbital housing 26. The rear end of the shaft 50 carries a tool support shaft gear 51 which meshes with and is driven by the large idler gear 37. The gear 51 is in alignment with the drive gear 36. Thus, when the idler shaft 38 is pulled forwardly, as described above, the idler gear 37 will be out of engagement with the tool support gear 51.

The front end of the tool support shaft 50 is journaled through the walls of the tool support housing 27 and a tool housing drive gear 52 is fixed thereto. This tool housing drive gear 52 includes an integral shoulder 53 which constitutes a clutch face. As shown most clearly in FIGS. 5 and 6, a slip clutch band 54 is operatively interposed between the tool housing 27 and the tool housing support shaft 50. This clutch band 54 surrounds the shoulder 53 of the housing drive gear 52 and the ends 55 of the clutch band 54 extend into a recess 56 formed in the end wall of the tool housing. A set screw 57 or the like is threaded through one wall of the housing into the recess 56 and a spring 58 is interposed between the screw and the clutch band 54 for maintaining a constant pressure of the slip clutch arrangement.

The tool housing drive gear 52 meshes with and drives an idler gear 62. This idler gear 62 is fixed on an intermediate or idler shaft 63 which is journaled in the front and back walls of the housing 27. The idler gear 62 in turn drives a tool drive gear 64 which is fixed to the tool drive shaft 65. The tool drive shaft 65 is also journaled in the front and back walls of the housing 27 and extends forwardly through the front wall of the housing. A work preparation tool 66 is carried on the forward end of the shaft 65.

The specific construction of the work preparation tool 66 depends largely upon the particular cleaning operation which is involved and is thus subject to variation. However, wire brushes are preferred for most applications since they have been found to produce outstanding results. Another suitable tool construction may comprise an annular resilient body having a plurality of strips of emery paper or similar abrading material secured to its periphery.

Figure 3:
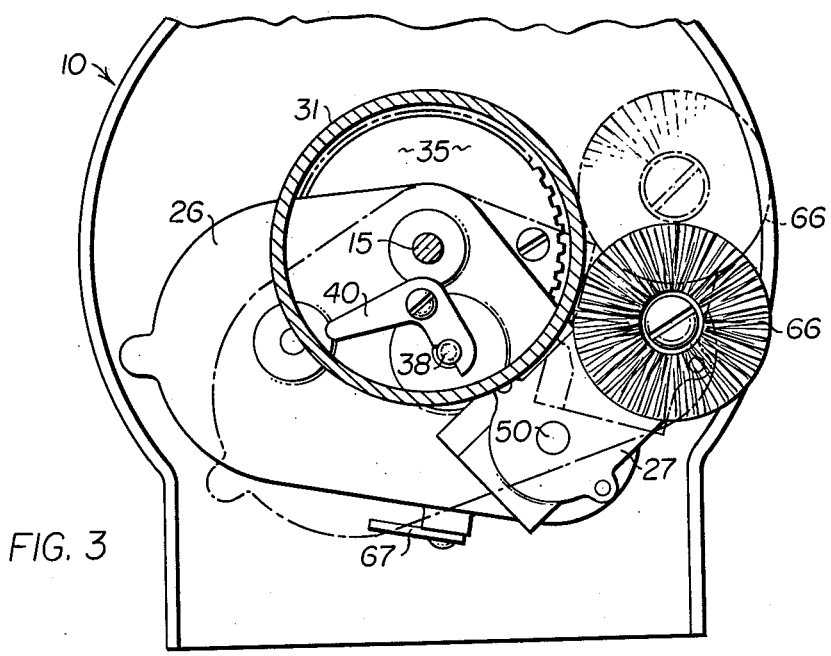

The apparatus thus far described is operative to perform a thorough cleaning and burnishing operation on the outside of a workpiece mounted on the mandrel 29 as shown in FIGS. 1 and 3. At the start of the operation, the idler shaft 38 in the orbital housing 26 may be pulled forwardly so that the large idler gear 37 is out of engagement with the drive gear 36 and the tool support shaft gear 51. In this position of the idler shaft, the power train for the work tool support 25 is broken so that the work tool support may fall away from the mandrel 29 to the position illustrated in FIG. 1. This permits the workpiece 31 to be easily inserted over the mandrel 29 (FIGS. 1 and 3). Subsequently, the idler shaft 38 is pushed rearwardly to engage the large idler gear 37 with the drive gear 36 and the gear 51, the idler shaft being locked in this operative position by the key 40 which engages in the neck 39 of the idler shaft (FIG. 7).

It will be noted that the small gear 45 on the idler shaft is of sufficient width so that it is always engaged with the rotation gear 46 even though the idler shaft may be pulled forwardly to break the power train. This is of advantage since it permits the idler gear to be easily re-engaged with the aligned gears 37 and 51 when the apparatus is to be operated.

When the idler shaft 38 has been locked in its operative position, actuation of the motor 13 will rotate the connected drive gear 36, the idler gear 37, the small gear 45 on the idler shaft, and the rotation gear 46. As explained above, rotation of the gear 46 causes the small pinion gear 48 to walk around the fixed gear 35. Thus, the work tool support 25 is caused to rotate and orbit around the main drive shaft 15. One of the operative progressions of the work tool support 25 about the main power shaft is illustrated in phantom lines in FIG. 3. It will be seen that the work tool support 25 orbits around the main shaft 15 in the same direction as the main shaft rotates.

At the same time the tool support 25 is orbiting around the main drive shaft, the large idler gear 37 drives the tool support shaft gear 51 to rotate the tool support shaft 50 and the tool housing drive gear 52. The tool support shaft 50 also rotates in the same direction as the main shaft 15. The slip clutch 54 connects the tool housing 27 to the tool housing support shaft 50 so that, as the shaft 50 is rotated, the tool housing will be carried with the shaft until the work preparation tool 66 engages the work piece 31. Once the work preparation tool is brought into abutment with the workpiece, the slip clutch 54 will commence to slip relative to the clutch face 53 on the gear 52. The rotation of the tool support shaft 50 in the same direction as the housing 26 is orbiting around the main shaft 15 tends to hold the work preparation tool in contact with the outside surface of the workpiece.

The tool housing drive gear 52 also drives the idler gear 62 and the tool drive gear 64 which is connected to the tool drive shaft 65. Prior to the time the work preparation tool engages the workpiece there is no relative rotation between the work preparation tool and the tool housing 27. However, when the work preparation tool is once brought into abutment with the workpiece and the slip clutch begins to slip relative to the clutch face 53, the work preparation tool will commence to rotate relative to the housing 27 and in the same direction of rotation as the main shaft 15. With the drive ratio shown, the work preparation tool rotates about its own axis relatively rapidly at the same time the work tool support is rotating about the axis of the drive shaft 15. Since the rotating work preparation tool 66 is constantly biased against the workpiece by the slip clutch construction, a very thorough cleaning and burnishing operation is performed on the outside of the workpiece.

Figure 8:
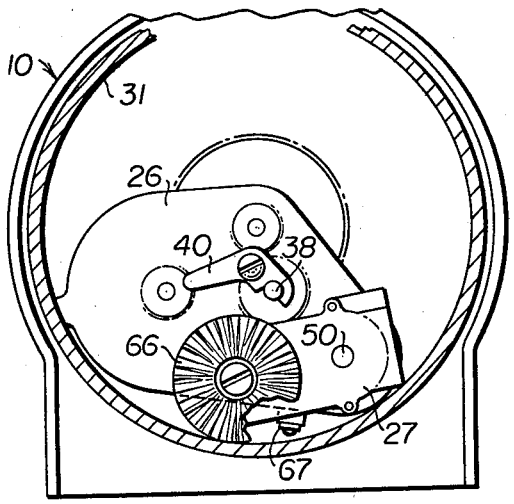

Referring now to FIG. 8, the tool housing 27 of the work tool support is shown in operative position for permitting the work preparation tool 66 to clean the insides of larger couplings. In the position illustrated in FIG. 8, the tool housing 27 has been rotated clockwise from its position illustrated in FIGS. 2 and 3. A stop member 67 is preferably connected to the orbital housing 26 to prevent the tool housing 27 from swinging counterclockwise back to the position of FIGS. 2 and 3. This stop 67 can be easily pivoted out of position so that the work preparation tool can again be swung to its position for external cleaning.

The operation of the apparatus for internal cleaning is essentially the same as that described above in connection with the external cleaning operation. However, it will be noted that, when the tool housing has been positioned as shown in FIG. 8, the tool support shaft 50 tends to rotate the tool housing 27 and the work preparation tool 66 away from the main shaft 15 and the center of the coupling being cleaned. Thus, the work preparation tool is constantly biased against the inside surface of the workpiece by the cooperative action of the slip clutch 54 and the tendency of the tool housing support shaft 50 to rotate the tool drive shaft 65 away from the drive shaft 15.

It will thus be seen that the invention provides a versatile work preparation apparatus for both internally and externally cleaning tubes and couplings of a wide variety of sizes. When internally cleaning, the tubes and couplings are mounted over the mandrel 29 and the tool support housing 27 positioned as generally shown in FIGS. 2 and 3. As the large idler gear 37 is connected to the drive gear 36 to establish the power train, the work preparation tool will be brought into engagement with the outside of the workpiece and caused to simultaneously rotate about its own axis and about the axis of the main drive shaft 15.

The tubes and couplings can be internally cleaned by swinging the tool support housing 27 to the position of FIG. 8. As explained above, the apparatus operates so that the work preparation tool is constantly biased against the inside surface of the work.

Figure 8A:
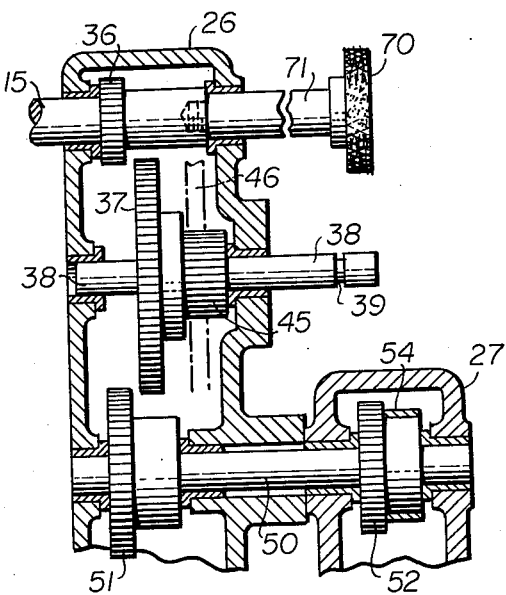

The apparatus of the invention also is adapted for cleaning the inside walls of relatively small tubes. This is accomplished by pulling the idler shaft 38 forwardly in the housing 26 so that the work tool support 25 assumes the inoperative position illustrated in FIG. 1. As shown in FIG. 8A, the auxiliary shaft 28 is then disconnected from the motor drive shaft 15 and a cleaning brush 70 of small diameter on a shaft 71 is connected thereto. When the workpiece is subsequently inserted over the small cleaning brush 70 and the motor 13 is actuated, the internal cleaning of the small tube can be effected without operating the work tool support 25.

Figure 9:
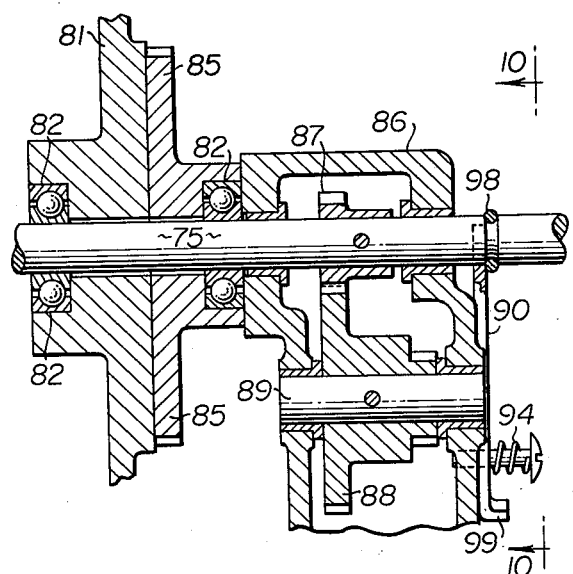
Figure 10:
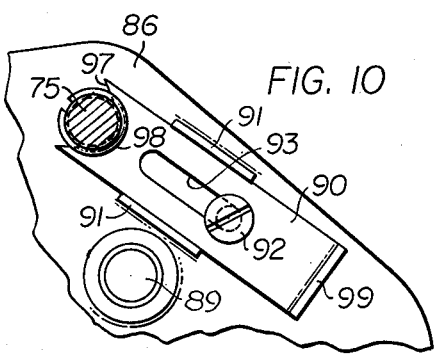

Reference is now made to FIGS. 9 and 10 which illustrate a modified construction for disconnecting the power train of the work tool support. This modified construction is essentially the same as that described in conjunction with FIGS. 1–8 and includes a motor drive shaft 75 which extends through the rear wall 81 of a frame housing corresponding to the frame housing 10 illustrated in FIG. 1. As shown, the motor drive shaft 75 is journaled through the housing 81 by bearings 82. A fixed pinion gear 85 surrounds the motor shaft 75 and is fixed to the inside surface of the back plate 81. The orbital housing 86 of the work tool support is mounted on the forwardly extending end of the motor drive shaft for both rotative and relative axial sliding movement.

A drive gear 87 is fixed to the motor drive shaft 75 within the orbital housing 86. This drive gear 87 drives a large idler gear 88 which is secured to and carried by an idler shaft 89. The idler shaft 89 is journaled in the front and back walls of the housing 86.

According to this modified embodiment of the invention, a locking plate 90 is carried on the front wall of the housing 86. This locking plate 90 is reciprocal in guides 91 toward and away from the motor drive shaft 75. A pin 92 extends through a slot 93 formed in the locking plate and carries a spring 94 for urging the locking plate against the front wall of the housing.

Referring particularly to FIG. 10, it will be seen that the upper end 97 of the locking plate 90 is arcuately formed to conform to the shaft 75. This upper end 97 of the locking plate engages a ring 98 on the motor drive shaft for locking the orbital housing 86 in its operative position in which the gears 87 and 88 are engaged. When it is desired to disengage the power train of the work support, the locking plate can be pulled away from the motor drive shaft by an integral finger abutment 99 so that the upper plate end 97 is out of engagement with the ring 98. In this disengaged position, the orbital housing 86 can be slid forwardly on the motor drive shaft so that the idler gear 88 is out of engagement with the drive gear 87. When the orbital housing 86 is slid forwardly to disengage the power train, the small rotation-producing pinion gear (not shown) is also disengaged from the fixed gear 85.

Figure 11:
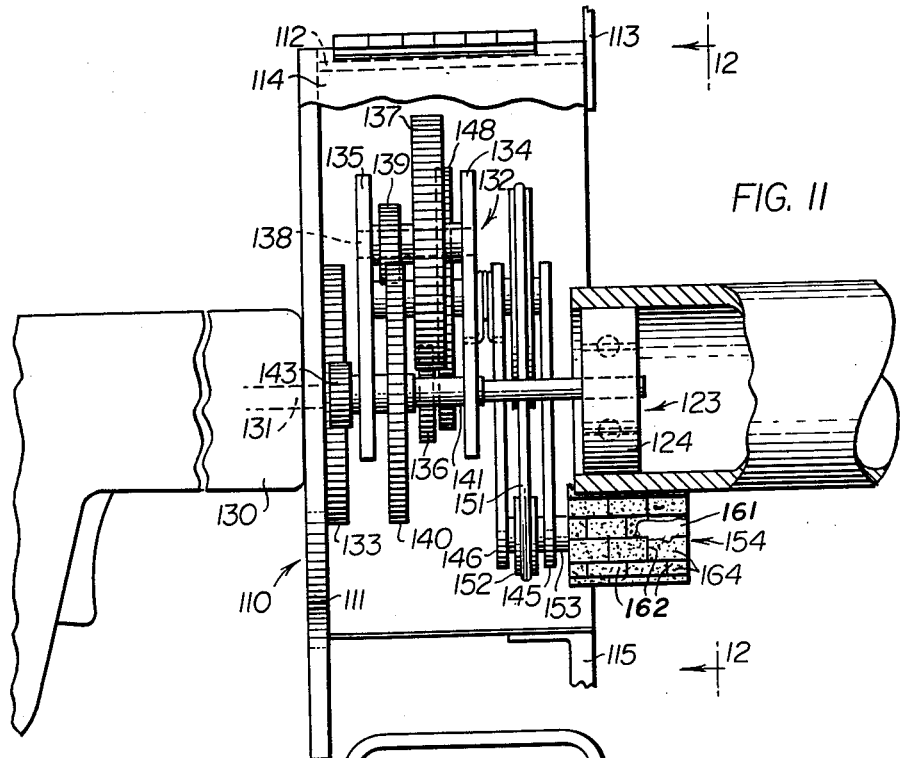
Figure 12:
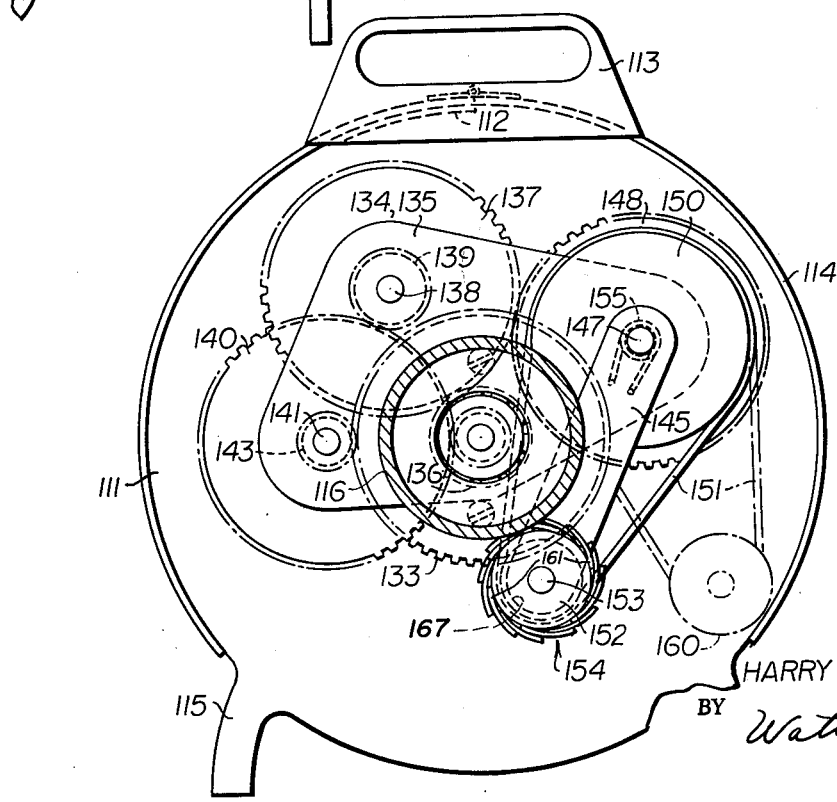
FIGURE 12 is a front elevational view taken on the line 12—12 of FIGURE 11.

Still another embodiment of the invention is illustrated in FIGS. 11 and 12. As in the case of the previously described preferred construction of the invention, the modified embodiment includes a housing 110 having a back wall 111 to which is connected a motor 130. The motor drive shaft 131 extends through the back wall of the housing and a work tool support, shown generally at 132, is connected to and carried by the shaft 131. The housing also includes a removable cover plate 114 and a handle 113.

A removable mandrel 123 is removably positioned on an extension of the shaft 131. As in the case of the mandrel 29, the mandrel 123 may be bearinged to provide a non-rotative outer race portion 124 to position and support a workpiece 116. The shaft extension for the mandrel 123 is preferably a pin separate from the drive shaft 131.

The tool support 132 has a rotating or orbital section which generally corresponds to the orbital housing 27 described in connection with FIGS. 1–8. This rotating section has front and back gear support plates 134 and 135. These gear support plates 134 and 135 support a gear train duplicating the gear train contained within the orbital housing 26. Thus, the drive shaft 131 has a drive gear 136 which drives an idler gear 137 secured to and carried by an idler shaft 138. A small idler gear 139 on the shaft 138 drives the large rotation-producing gear 140 which is secured to the rotation shaft 141.

The rotation shaft 141 extends through the gear plate 135 and is provided with a small rotation-producing pinion gear 143. This small pinion gear 143 meshes with a fixed gear 133 on the back plate of the housing to cause the tool support section defined by the plates 134 and 135 to orbit around the shaft 131.

The idler gear 137 also drives a tool support shaft gear 148 which is mounted on the tool support shaft 147. This tool support shaft 147 extends from the back plate 135 forward through the front plate 134.

A pivotal tool support section corresponding generally to the tool housing 27 is also provided. This pivotal support section includes front and back tool supporting plates 145 and 146 which are mounted on the forward end of the tool support shaft 147.

In the embodiment of FIGS. 10 and 11, the portion of the power train contained in the pivotal section of the tool support 132 is a belt transmission. To this end, a large tool rotation pulley 150 is secured to the tool support shaft 147 between the front and back tool support plates 145 and 146. A belt 151 connects the large pulley 150 to a smaller tool drive pulley 152. The smaller pulley 152 is secured to and carried by a tool drive shaft 153. The tool drive shaft 153 is journaled in the front and back tool support plates 145 and 146. A work preparation tool 154 is carried by the tool drive shaft 153.

The tool support plates 145 and 146 are journaled on the tool support shaft 147. A slip clutch 155 is interposed between the shaft 147 and the back plate 146. At the start of a work performance operation, the tool 154 may be spaced from and out of engagement with the workpiece 116 as shown in phantom outline in FIGURE 11. When rotation of the tool support shaft 147 commences, the front and back tool support plates 145 and 146 will move with it until the work preparation tool 154 abuts the workpiece 116. Since, at the time prior to abutment of the workpiece by the work preparation tool, these plates 145 and 146 are moving with the shaft 147, there is no rotation relatively between the plates and the large tool drive pulley 150 at this time. Since there is no relative rotation between these elements, there will be no rotation of the work preparation tool until it is brought into abutment with the workpiece. Once the tool is brought into abutment with the workpiece, the slip clutch 155 will begin to slip relative to the plates 145 and 146 and the tool will commence to rotate about its own axis. Simultaneously, because the entire work support is rotating about the axis of the drive shaft 131, the work preparation tool 154 is orbited about the workpiece 116. It is also constantly biased against the workpiece by the slip clutch means. With this arrangement, a very thorough cleaning and burnishing operation is also performed.

Another of the outstanding advantages of the invention resides in the work preparation tool 154. The tool comprises an annular resilient body 167 which is preferably natural or synthetic rubber. Portions 161 near one edge of each of a plurality of spaced strips are secured to the periphery of the rubber annular part 167. These portions 161 of the strips are secured at circumferentially spaced locations. The strips are preferably emery paper or other similar abrading material. The strips are slit at 162, FIGURE 11, to provide a plurality of abrading fingers, 164. These slits 162 are each transverse to the strips while the strips generally parallel to the axis of the tool. The strips are positioned so they overlap and generally resemble the shingles on a roof when viewed in plan as seen in FIGURE 11.

Figure 11A:
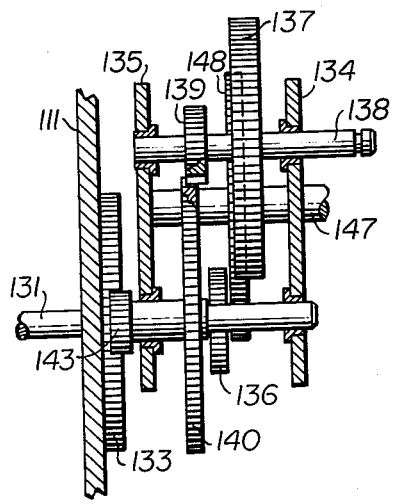

It will be evident that suitable provision can be made for disengaging the power train of the work tool support 132 by providing for relative movement between the drive gear 136 and the idler gear 137. For example, as shown in FIG. 11A, the idler shaft 138 can be made reciprocal in the housing plates 134 and 135, so that it can be pulled forwardly to disengage the idler gear from the drive gear.

As described above, an important object of the present invention is to provide a versatile cleaning apparatus capable of simultaneously rotating several cleaning brushes of different sizes so that tubes and couplings of different diameters can be internally cleaned. A modified construction of the invention for accomplishing this objective is illustrated in FIGS. 13, 14 and 15. This structure is shown as including a frame housing 10 which corresponds to the frame housing discussed in connection with FIGS. 1–8.

As in the case of the preferred embodiment of the invention, a motor 13 is carried by a motor bracket 14. For reasons to be more fully discussed, the motor bracket 14 is preferably removably connected to the back plate of the housing 10, as by bolts 199. The motor drive shaft 15 is journaled through the back plate of the frame housing 10 and is connected in the manner previously described to a work tool support which includes an orbital housing (not shown) and a tool housing 27. The work tool drive shaft 65 extends from the tool housing 27 for connection to a suitable work preparation tool (also not shown). The power train of the work tool support is preferably disengageable in the manner illustrated in either the embodiment of FIGS. 1–8 or the embodiment of FIGS. 9 and 10.

A frame 200 is connected to the top of the frame housing 10 by bolts 201. A center drive shaft 202 is rotatably journaled in the frame and a cleaning tool 203 is fixed to its forward end. The opposite end of the shaft 202 carries a pulley 206 which is operatively connected to a pulley 204 on the drive shaft 15 by a belt 205.

Figure 15A:
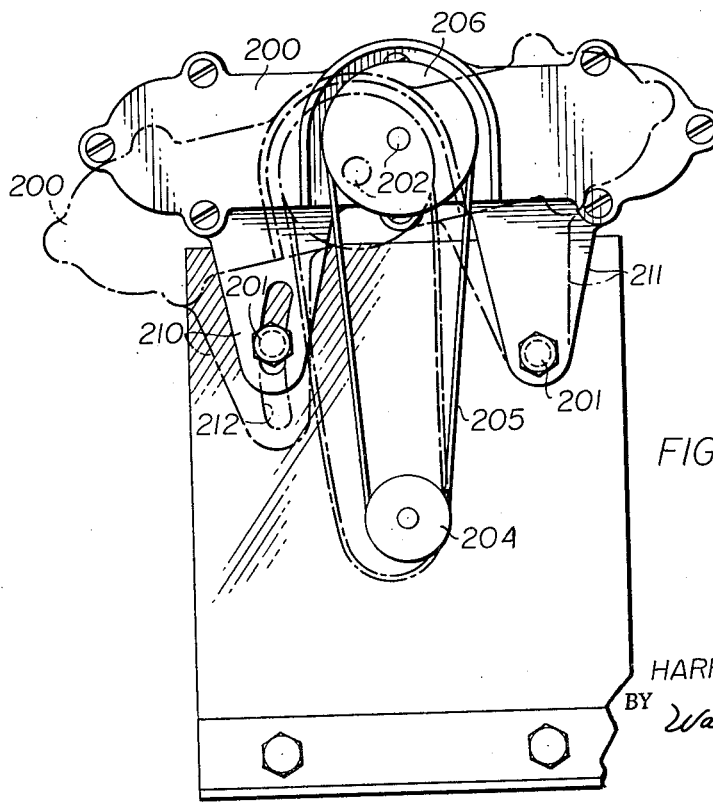
FIGURE 15A is a rear elevational view of the apparatus illustrated in FIG. 13.

As shown in FIGS. 14, 15 and 15A, the frame 200 includes a pair of legs 210 and 211. The leg 210 is formed with an arcuate slot 212 which receives one of the bolts 201. The other leg 211 has a bolt hole 213 for receiving another of the bolts 201. When the bolt extending through the slot 212 is loosened, the frame 200 can be slid downwardly toward the motor 13 so that the belt 205 is disengaged from the pulley 204. Alternatively, when it is desired to operate the shaft 202, the frame 200 can be moved upwardly so that the belt 205 is operatively engaged with the pulley 204.

As shown most clearly in FIG. 14, the shaft 202 also carries a drive gear 215 at the rear of the frame 200. This drive gear 215 meshes with idler gears 216 and 217. These idler gears 216 and 217 are fixed on idler shafts which are rotatably mounted in the frame 200 at either side of the shaft 202. The idler gears 216 and 217 are in turn engaged with tool gears 218 and 219, respectively. The tool gears 218 and 219 are fixed on tool shafts which are also rotatably journaled in the frame 200 parallel to the main drive shaft 202 and the idler shafts. Work tools 220 and 221 are fixed to the forward ends of the shafts to which the tool gears 218 and 219 are respectively connected.

A second pair of idler gears 222 and 223 are in meshing engagement with the tool drive gears 218 and 219 respectively. These idler gears 222 and 223 are also fixed on idler shafts which are journaled in the frame 200. The idler gears 222 and 223 mesh with another set of tool gears 224 and 225, respectively. The tool gears 224 and 225 are fixed on tool shafts having work tools 226 and 227 secured to their forward ends. Thus, rotation of the drive shaft 202 and the drive gear 215 will produce corresponding rotation of the other tool gears and tool shafts.

The apparatus of FIGS. 13, 14 and 15 is operated by first disconnecting the power train of the tool support. The shaft 202 is then operatively connected to the motor drive shaft 15 by adjusting the frame 200 in the manner previously described. Thus connected, it will be seen that a plurality of tubes can be simultaneously cleaned with the work tools 203, 220, 221, 226, and 227. An important advantage is that tubes of different sizes can be internally cleaned without having to stop the motor 13 and connect a different size tool after each size tube has been cleaned.

As illustrated, the work tools are all of different size. However, it will be apparent that the work tools could be of the same size, if desired. It will also be apparent that the frame 200 could be constructed to mount a greater or lesser number of tool shafts.

In the arrangement illustrated in FIG. 16, the frame housing 10 is completely disconnected from the motor bracket 14 and the motor bracket connected directly to the frame 200. This arrangement provides a compact and convenient assembly for a continuous cleaning operation in which a series of relatively small tubes are to be internally cleaned.

Many additional modifications and variations of the invention will be apparent to those skilled in the art in view of the foregoing detailed description. Therefore, it is to be understood that, within the scope of the appended claims, the invention can be practiced otherwise than as specifically disclosed.

What is claimed is:

1. A work preparation apparatus for rotary cleaning operations comprising a frame, a main drive shaft journaled in said frame, a motor operatively connected to said main drive shaft, a work tool support, said tool support including a first section freely mounted on said main drive shaft and a second section pivotally connected to said first section, a tool drive shaft rotatably carried by said second section parallel to said main drive shaft, and power transmission means carried by said work tool support, said power transmission means being connected to said frame and to said tool drive shaft for simultaneously orbiting said first section about said main drive shaft while rotating said tool drive shaft and pivotally moving it with respect to said main drive shaft.

2. The apparatus as claimed in claim 1 wherein said power transmission means includes means for pivoting said second section of the tool support in the same direction of rotation as said main drive shaft.

3. The apparatus as claimed in claim 2 wherein said means for pivoting said second section includes a slip clutch.

4. A preparation device for pipes and the like comprising a frame, a motor mounted on the frame, a drive shaft connected to the motor, a first tool support section rotatably mounted on the shaft for rotation relative to the shaft and the frame about the axis thereof, power transmission means carried by the first section and connected to the shaft and frame to cause rotation of the first section about the axis of the shaft when the shaft is rotated, a second tool support section pivotally carried by a first section, a tool shaft journaled in the second section, a rotatable tool carried by the tool shaft for performing a work operation, said power transmission means including means operably connected to the tool shaft for rotating said tool and means connected to said second section for moving it relative to said first section.

5. A work preparation apparatus for rotary cleaning operations comprising a frame, a drive shaft journaled in said frame, a work tool support freely mounted on said drive shaft, a rotatable tool drive shaft carried by said tool support for mounting a work preparation tool, and power train means operatively connected to said frame, said tool support, said drive shaft and said tool drive shaft for orbiting said tool support around said drive shaft and simultaneously rotating said tool drive shaft, said power train including means for operatively disengaging said drive shaft from said tool support and said tool drive shaft while permitting said drive shaft to rotate.

6. A work preparation device for pipes and the like comprising a frame, a motor mounted on the frame, a drive shaft connected to the motor, a first tool support section rotatably mounted on the shaft for rotation relative to the shaft and relative to the frame about the axis of the shaft, power transmission means carried by the first section and connected to the shaft and frame to cause rotation of the first section about the axis of the shaft when the shaft is rotated, an intermediate shaft journaled in the first section and in driving connection with said power transmission means, a second tool support section carried by the intermediate shaft, a tool shaft journaled in said second section, a rotatable tool carried by the tool shaft for performing a work operation, drive means interposed between the intermediate and tool shafts for rotating the tool shaft and said tool, said drive means including means connected to said second section for moving it relative to said first section.

7. The device of claim 6 wherein said means connected to said second section comprises slip clutch means interposed between the intermediate shaft and the second section.

8. The device as claimed in claim 7 wherein said slip clutch means comprises a clutch band surrounding clutch face means connected to said intermediate shaft and means carried by said second section for engaging said clutch band.

9. A work preparation device for pipes and the like comprising a frame, a motor mounted on the frame, a drive shaft connected to the motor, a first tool support section rotatably mounted on the shaft for rotation relative to the shaft and relative to the frame about the axis of the shaft, gearing carried by the first section and connected to the frame to cause rotation of the first section about the axis of the shaft when the shaft is rotated, a second tool support section pivotally carried by the first section, a tool shaft journaled in a second section, a rotatable tool carried by the tool shaft for performing a work operation, drive means interposed between the shafts and operatively connected thereto for rotating the said tool, and slip clutch means operatively disposed between said first and second sections for pivotally moving said second section and said tool.

10. A work preparation device comprising a housing and frame structure, a motor having a drive shaft mounted on the structure, a first tool support section journaled on the drive shaft for rotation relative to the drive shaft and said structure about the axis of the drive shaft, power transmission means carried by the first section and connected to the drive shaft and to the frame structure to cause rotation of the first section about the axis of the drive shaft when it is rotated, said power transmission means including a drive gear on the drive shaft, an idler gear carried by the first section and in driven engagement with the drive gear, a rotation-causing shaft journaled in the first section, a section rotating gear carried by the rotation shaft and in engagement wih the idler gear, a fixed gear on the structure, and a gear on the rotation shaft in engagement with the fixed gear to cause said first section to rotate about the axis of the drive shaft, an intermediate shaft journaled in the first section, a tool drive gear mounted on the intermediate shaft and engaging the idler gear, a second tool support section mounted on the intermediate shaft, a tool shaft journaled in the second section, a rotatable work performance tool carried by the tool shaft, and drive means interposed between the intermediate and tool shafts for rotating the tool shaft and said tool, said drive means including slip clutch means interconnecting the intermediate shaft and the second section for moving it relative to the first section, first and second pulleys on the intermediate and tool shafts, and a belt drivingly connecting the pulleys.

11. A work preparation device comprising a housing and frame structure, a motor having a drive shaft mounted on the structure, a first tool support section journaled on the shaft for rotation relative to the shaft and the frame and housing structure, a rotation shaft journaled in the first section, means interposed between the rotation shaft and said structure to cause said first section to rotate about the axis of the drive shaft when the rotation shaft is rotated, an intermediate shaft journaled in the first section, a second tool support section mounted on the intermediate shaft, slip clutch means interconnecting the intermediate shaft and the second section to bias the second section toward a workpiece, a tool shaft journaled in the second section, a work performance tool carried by the tool shaft, and drive means connecting the drive shaft to each of the other shafts to cause rotation of all of the shafts when the drive shaft is rotated.

12. A work preparation apparatus for rotary cleaning operations comprising a frame, a drive shaft rotatably mounted in said frame, motor means operatively connected to said drive shaft, a work tool support, said tool support including an orbital housing freely mounted on said drive shaft and a tool housing pivoted to said orbital housing, a tool drive shaft rotatably carried by said tool housing for mounting a work preparation tool in spaced parallel adjacency to said drive shaft, and power train means contained within said orbital housing and said tool housing, said power train means being operatively connected to said drive shaft, said frame and said tool shaft for orbiting said orbital housing around said drive shaft and simultaneously rotating said tool drive shaft, said power train including means for operatively disengaging said drive shaft from said tool support while permitting said drive shaft to rotate.

13. The apparatus as claimed in claim 12 including a slip clutch operatively connected between said orbital housing and said tool housing for pivoting said tool housing relative to said orbital housing and causing a work preparation tool connected to said tool drive shaft to be biased against the surface of a workpiece to be cleaned.

14. The apparatus as claimed in claim 13 including a stop on said tool support for limiting pivotal movement of said tool housing with respect to said orbital housing, said stop being engageable with said tool housing to hold it in a position wherein operation of said power train tends to move said tool drive shaft away from said drive shaft.

15. A work preparation apparatus for rotary cleaning operations, said apparatus comprising in combination:
   (a) a frame,
   (b) a drive shaft journaled in said frame,
   (c) a motor operatively connected to said drive shaft,
   (d) a gear coaxial with said drive shaft and fixed to said frame,
   (e) an orbital housing freely mounted on said drive shaft,
   (f) a drive gear fixed to said drive shaft,
   (g) an idler shaft journaled in said orbital housing,
   (h) an idler gear carried by said idler shaft for meshing engagement with said drive gear,
   (i) a second gear carried by said idler shaft,
   (j) a rotation shaft journaled in said orbital housing,
   (k) a rotation gear on said rotation shaft in meshing engagement with said second gear,
   (l) a pinion gear on said rotation shaft in meshing engagement with said fixed gear for causing said orbital housing to orbit around said drive shaft,
   (m) a tool support shaft journaled in said orbital housing,
   (n) a tool support shaft gear on said support shaft for meshing engagement with said idler gear,
   (o) a tool housing freely mounted on said support shaft,
   (p) a slip clutch operatively connecting said support shaft and said tool housing,
   (q) a tool drive shaft journaled in said tool housing, and
   (r) gear means connected between said tool support shaft and said tool drive shaft, whereby operation of said motor rotates said tool drive shaft and simultaneously tends to pivot said tool housing on said support shaft in the same direction as the direction of orbital movement of said orbital housing.

16. The apparatus as claimed in claim 15 wherein said gear means comprises a tool housing drive gear fixed to said support shaft, an intermediate gear shaft journaled in said tool housing, an intermediate gear on said intermediate shaft in meshing engagement with said tool housing drive gear, and a tool drive gear on said tool drive shaft in meshing engagement with said intermediate gear.

17. The apparatus as claimed in claim 15 including a stop mounted on said orbital housing, said stop being engageable with said tool housing to hold it in a position wherein rotation of said tool housing support shaft tends to pivot said tool drive shaft away from said drive shaft.

18. The apparatus as claimed in claim 15 wherein said idler shaft is axially reciprocal in said obital housing for permitting said idler gear to be move out of meshing engagement with said drive gear and said tool support shaft gear.

19. The structure as claimed in claim 15 wherein said orbital housing is axially slidable on said drive shaft of said motor so that said idler gear can be disengaged from said drive gear.

20. The apparatus as claimed in claim 15 wherein said slip clutch comprises a clutch band surrounding clutch face means fixed to said support shaft and means carried by said tool housing for engaging said clutch band.

21. The structure as claimed in claim 20 wherein said engaging means includes means for regulating the pressure between said clutch band and said clutch face means.

22. A work preparation apparatus for rotary cleaning operations comprising frame means; a main drive shaft journaled in said frame means, a motor operatively connected to said main drive shaft, a work tool support, said tool support including a first section freely carried on said main drive shaft and a second section pivotally connected to said first section; a tool drive shaft journaled in said second section in parallel spaced adjacency to said main drive shaft; power train means carried by said tool support, said power train means including means for orbiting said first section around said main drive shaft, means for pivoting said second section relative to said first section whereby said tool drive shaft is moved toward and away from said main drive shaft, means for simultaneously rotating said tool drive shaft, and means for selectively engaging and disengaging said power train means and said main drive shaft; and an auxiliary shaft detachably connected to said main drive shaft for rotation therewith; and work-engaging means operatively connected to said main drive shaft, said work-engaging means being engageable within a tubular workpiece.

23. The apparatus claimed in claim 22 wherein said work-engaging means comprises a mandrel journaled on said auxiliary shaft.

24. The apparatus as claimed in claim 22 wherein said work-engaging means comprises a plurality of parallel tool shafts journaled in said frame means, a work tool fixed to each tool shaft, and gear drive means connecting said tool shafts to said auxiliary shaft for rotating said tools.

25. The apparatus as claimed in claim 24 wherein said frame means comprises a frame housing and a tool frame, said plurality of tool shafts being journaled in said tool frame.

26. The apparatus as claimed in claim 25 wherein said drive means comprises a gear mounted on each tool shaft, an auxiliary shaft gear fixed to said auxiliary shaft, a plurality of idler shafts journaled in said tool frame, one of said idler shafts being disposed between adjacent tool shafts and between said auxiliary shaft and said tool shafts, an idler gear on each idler shaft in meshing engagement with the gears adjacent thereto, and belt drive means connecting said auxiliary shaft to said main shaft.

27. A mechanism for performing a rotary work operation comprising, a frame, a main drive shaft journaled in the frame, a work tool support freely mounted on the main drive shaft, a rotatable tool drive shaft carried by the tool support for mounting a work preparation tool, power transmission means connected to the frame, the main drive shaft, the tool drive shaft and the support for orbiting the tool support about the main drive shaft and simultaneously rotating the tool drive shaft, said power transmission means including means for operatively disengaging the main drive shaft of the tool support and the tool drive shaft while permitting the main drive shaft to rotate, a work preparation tool rotatably mounted on the support, said work preparation tool comprising an annular resilient body, a plurality of flexible abrasive strips, each of said strips having a portion adjacent one axis fixed to said body, said strips being fixed to the body at circumferentially spaced locations around the periphery of the body, each of said strips being longitudinally transversely slit along lines each commencing at an edge of a strip remote from said one edge, and each of the slits extending toward the one edge of its strip to divide each strip adjacent its other edge into a plurality of abrading fingers.

28. In a mechanism for forming a rotary work operation, a work preparation tool comprising an annular resilient body, a plurality of flexible abrasive strips, each of said strips having a portion adjacent one edge fixed to said body, said strips being fixed to the body at circumferentially spaced locations around the periphery of the body, each of said strips being transversely slit along lines each commencing at an edge of a strip remote from said one edge, and each of the slits extending toward the one edge of its strip to divide each strip adjacent its other edge into a plurality of abrading fingers.

29. A work preparation apparatus for rotary cleaning operations comprising a frame, a main drive shaft journaled in said frame, a motor operatively connected to said drive shaft, work tool support means freely mounted on said main drive shaft, a rotatable tool drive shaft for carrying a work preparation tool, said work tool support means including means for pivotally mounting said tool drive shaft for movement toward and away from said main drive shaft, and power transmission means connected to said frame, said support means and said tool drive shaft for simultaneously orbiting said support means about said main drive shaft while rotating said tool drive shaft, said power transmission means including a slip clutch for pivotally moving said support means and said tool drive shaft until the work preparation tool engages a workpiece and thereafter biasing the work preparation tool against the surface of the workpiece.

References Cited in the file of this patent
UNITED STATES PATENTS

| | | |
|---|---|---|
| 653,703 | Scott et al. | July 17, 1900 |
| 961,969 | Klingloff | June 21, 1910 |
| 1,215,482 | Chamberlain | Feb. 13, 1917 |
| 1,217,417 | Cumming | Feb. 27, 1917 |
| 1,480,526 | Chiles | Jan. 8, 1924 |
| 2,305,079 | Heldenbrand | Dec. 15, 1942 |
| 2,447,748 | Graham | Aug. 24, 1948 |
| 2,842,902 | Miller et al. | July 15, 1958 |